United States Patent
Okamoto

[19]

[11] Patent Number: 5,898,514
[45] Date of Patent: Apr. 27, 1999

[54] BEAM SCANNING SYSTEM

[75] Inventor: Naoyuki Okamoto, Tokyo, Japan

[73] Assignee: Asahi Kogaku Kogyo Kabushiki Kaisha, Tokyo, Japan

[21] Appl. No.: 08/872,393

[22] Filed: Jun. 10, 1997

[30] Foreign Application Priority Data

Jun. 11, 1996 [JP] Japan .................................. 8-171907

[51] Int. Cl.⁶ ................................................ G02B 26/08
[52] U.S. Cl. ......................... 359/205; 359/207; 359/208; 359/216; 359/217
[58] Field of Search .................................. 359/212, 213, 359/214, 215, 216, 217, 218, 219, 738, 739, 740, 196, 197, 198, 199, 200–211; 347/259, 260

[56] References Cited

U.S. PATENT DOCUMENTS

| | | |
|---|---|---|
| 4,823,002 | 4/1989 | Saito . |
| 5,134,513 | 7/1992 | Morimoto . |
| 5,572,353 | 11/1996 | Iizuka . |
| 5,621,562 | 4/1997 | Hama . |
| 5,724,172 | 3/1998 | Ota ........................................... 359/216 |
| 5,748,354 | 5/1998 | Iizuka ...................................... 359/205 |
| 5,793,514 | 8/1998 | Taylor et al. ............................ 359/201 |

FOREIGN PATENT DOCUMENTS 6-265810  9/1994  Japan .

*Primary Examiner*—Cassandra Spyrou
*Assistant Examiner*—Eundra Cherry
*Attorney, Agent, or Firm*—Greenblum & Bernstein, P.L.C.

[57] ABSTRACT

An optical beam scanner is provided in which light emitted from a light source and transmitted through a slit formed in a diaphragm plate is made incident upon a polygonal mirror through a cylindrical lens having positive power in the sub-scanning direction. The light reflected by the polygonal mirror is converged onto an object surface to be scanned through an optical image forming system. A plane mirror is provided between the diaphragm plate and the polygonal mirror to reflect the light emitted from the light source toward the polygonal mirror. The optical elements provided between the light source and the optical image forming system are housed in a casing having a bottom surface perpendicular to the axis of rotation of the polygonal mirror. The light emitted from the light source toward the plane mirror is parallel with the bottom surface. The light incident upon the polygonal mirror and the light reflected by the polygonal mirror are separated in the sub-scanning direction. The slit has different diameters in two orthogonal directions. The longitudinal direction of the slit is inclined with respect to the bottom surface, so that the longitudinal direction of a slit image projected on a reflection surface of the polygonal mirror through the plane mirror is substantially parallel with the bottom surface. The direction of the generatrix of the cylindrical lens is inclined with respect to the bottom surface in the same direction as the longitudinal direction of the slit.

12 Claims, 4 Drawing Sheets

BEAM SCANNING SYSTEM

BACKGROUND OF THE INVENTION

1. Field of the Invention

The present invention relates to an optical beam scanner which is incorporated in an optical system of a laser printer, and more particular, the present invention, it relates to a control system of a diaphragm plate therein.

2. Description of the Related Art

There has been a need for the realization of a compact scanner which can be incorporated in an optical system of a laser printer, etc., in accordance with the miniaturization of the laser printer. In a known reflection-type compact beam scanner, the laser beam deflected by a polygonal mirror is reflected by a curved mirror in the sub-scanning direction at a predetermined angle toward the polygonal to mirror laser beam is made incident upon an object surface to be scanned through an anamorphic lens, as disclosed in Japanese Unexamined Patent Publication No. 6-265810 (referred to as "JPP '810" hereinafter) for example.

The reflection surfaces of the polygonal mirror are parallel with the center axis (rotation axis) of the polygonal mirror about which the polygonal mirror rotates. Namely, assuming that a reference plane is defined by a plane perpendicular to the center axis of the polygonal mirror, the reflection surfaces are perpendicular to the reference plane. Since a bundle of light (light bundle) emitted from the light source is separated in the sub-scanning direction by the polygonal mirror, the light source is disposed such that the light incident upon the polygonal mirror defines a predetermined angle with respect to the reference plane in the sub-scanning plane.

However, in the known reflection-type beam scanner mentioned above, the light path from the light source to the polygonal mirror is defined by a straight line since no reflection system is used. Therefore, it is impossible to make the length of the beam scanner in the direction of the straight light path smaller than the distance between the light source and the polygonal mirror. Hence, the beam scanner cannot be miniaturized.

A solution to miniaturize an optical system is to bend the light path using a mirror disposed in the light path from the light source to the polygonal mirror. However, this solution is not useful for miniaturizing and the optical system in the main scanning direction in which the light bundle is moved to scan an object, since the size of the optical system in the main scanning direction is determined by the width of the curve mirror and the anamorphic lens. Namely, even if the light path from the light source to the polygonal mirror is bent into the main scanning direction, substantial reduction in the size of the entire optical system cannot be expected.

In the simplest arrangement to bend the light path using a plane mirror, the latter is added in the optical system as disclosed in JPP '810 mentioned above, so that the positional relationship between the light source and the polygonal mirror is optically equivalent to that in the optical system in JPP '810. The line normal to the plane mirror is parallel with the reference plane. Hence, the light path which is developed without taking the reflection by the mirror into consideration is identical to that in JPP '810. In this arrangement, the space for the optical system in the direction of travel of the light incident upon the polygonal mirror is reduced, nevertheless, the height of the optical system in the sub-scanning direction cannot be decreased in comparison with the prior art.

If the direction of the light incident upon the plane mirror is made parallel with the reference plane, the height of the optical system in the sub-scanning direction can be decreased. In order to achieve this, it is necessary to incline the line normal to the plane mirror with respect to the reference plane, instead of inclining the light incident upon the polygonal mirror with respect to the reference plane.

In a first arrangement in which the normal line to the plane mirror is inclined with respect to the reference surface, the reference plane itself is inclined with respect to the bottom surface of the casing; the light path of light incident upon the plane mirror and the normal line to the plane mirror are both parallel with the bottom surface of the casing; and the center axis (rotation axis) of the polygonal mirror is inclined with respect to the bottom surface of the casing. In the first arrangement, the mounting to the casing and the adjusting of the polygonal mirror are difficult.

In a second arrangement in which the normal line to the plane mirror is inclined with respect to the reference surface, the reference plane is parallel with the bottom surface of the casing; the light path of light incident upon the plane mirror is parallel with the bottom surface of the casing; the center axis (rotation axis) of the polygonal mirror is perpendicular to the bottom surface of the casing; and the normal line to the plane mirror is inclined with respect to the bottom surface of the casing. In the second arrangement, there is a problem in that a beam is not correctly focused on a surface to be scanned (i.e., the shape of the beam spot is deformed). This will be discussed below.

In general, in an optical beam scanner, it is preferable that the shape of the beam spot on the image surface be elongated in the sub-scanning direction. In order to achieve this, a diaphragm plate having a slit which as a major diameter in the main scanning direction and a minor diameter in the sub-scanning direction is provided in the vicinity of the light source. The diameter of the light bundle differs in the main scanning direction and sub-scanning direction due to the slit, so that the f-number of the optical system is substantially varied to thereby vary the diameter of the beam spot.

However, in the second arrangement in which the normal line to the plane mirror is inclined with respect to the bottom surface of the casing, the direction of the section of the light bundle is distorted upon reflection by the plane mirror. Consequently, if the longitudinal direction of the slit is parallel with the bottom surface of the casing as in the conventional scanner, the direction corresponding to the longitudinal direction of the slit does not coincide with the main scanning direction on the reflection surface of the polygonal mirror due to the distortion. Therefore, the direction in which the f-number is substantially reduced is not identical to the main scanning direction. Hence, the direction of the beam spot formed on the surface to be scanned is rotated with respect to an ideal direction by a predetermined angle. If an ideal beam spot having a minor diameter in the main scanning direction is rotated, the spot diameter in the main scanning direction, i.e., the size of the beam spot projected on the line in the main scanning direction is increased, so that the resolution of the image is attenuated. Consequently, the required performance of the beam scanner cannot be achieved.

SUMMARY OF THE INVENTION

It is an object of the present invention to provide an optical beam scanner in which a plane mirror is provided between a light source and a polygonal mirror to reduce the space for the optical system in the travel direction of light incident upon the polygonal mirror. The light path of the light incident upon the plane mirror is parallel with a reference plane to reduce the space in the sub-scanning direction. The polygonal mirror can be easily mounted to the casing and adjusted if the normal line to the plane mirror is inclined with respect to the reference surface. The, and direction of the shape of the beam spot formed on a surface (object) to be scanned can be made coincident with an ideal direction.

To achieve the object mentioned above, according to an aspect of the present invention, there is provided a reflection type of optical beam scanner in which light emitted from a light source and transmitted through a slit formed in a diaphragm plate is made incident upon a deflector through a cylindrical lens having positive power in the sub-scanning direction. The light reflected by the deflector is converged onto an object surface to be scanned through an optical image forming system. A plane mirror is provided in a light path defined between the diaphragm plate and the deflector to reflect the light emitted from the light source toward the deflector.

Optical elements provided between the light source and the optical image forming system are housed in a box-like casing having a bottom surface perpendicular to the axis of rotation of the polygonal mirror about which the polygonal mirror rotates.

The light source is disposed so that light emitted from the light source toward the plane mirror is parallel with the bottom surface of the casing.

The plane mirror is disposed so that the light incident upon the polygonal mirror and the light reflected by the polygonal mirror are separated in the sub-scanning direction.

The slit has different diameters in two orthogonal directions. The longitudinal direction of the slit is inclined with respect to the bottom surface at an inclination angle. The longitudinal direction of an image of the slit projected on a reflection surface of the polygonal mirror through the plane mirror is substantially parallel with the bottom surface.

The cylindrical lens is disposed so that the direction of the generatrix is inclined with respect to the bottom surface in the same direction as the longitudinal direction of the slit at an inclination angle.

The present disclosure relates to subject matter contained in Japanese Patent Application No. 08-171907 (filed on Jun. 11, 1996) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
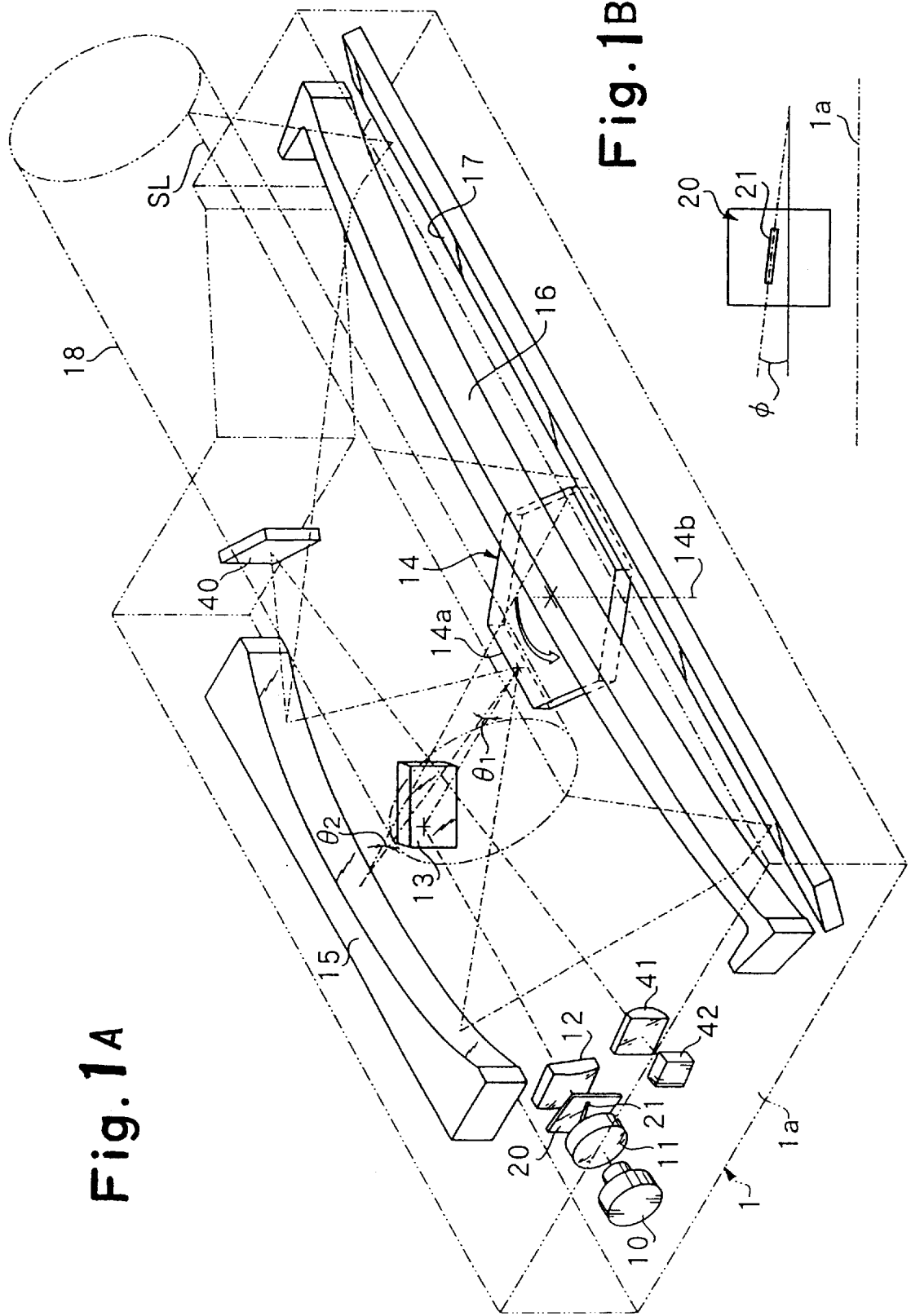
FIG. 1A is a perspective view of an optical system of a reflection-type beam scanner according to an embodiment of the present invention.
FIG. 1B is a side view of a diaphragm plate viewed from the cylindrical lens side.

The illustrated embodiment is applied to an exposure unit used in a laser printer, in which laser beams which have been modulated (ON/OFF) in accordance with input image signals are moved on a photosensitive drum to scan the same to thereby form an electrostatic latent image.

In the specification, the principal ray when the laser beam which scans the photosensitive drum reaches the scan center defines a reference optical axis; the scanning direction of the laser beam which scans the photosensitive drum defines a main scanning direction; and, the direction perpendicular to the main scanning direction in a plane whose normal line is defined by the reference optical axis defines a sub-scanning direction, respectively. Moreover, the power of the optical elements which contributes to a divergence or convergence of the laser beams on the photosensitive drum in the main scanning direction defines the power in the main scanning direction; and the power of the optical elements which contributes to a divergence or convergence of the laser beams on the photosensitive drum in the sub-scanning direction defines the power in the sub-scanning direction, respectively.

In the optical system of the beam scanner in the illustrated embodiment, the divergent beam emitted from a semiconductor laser (light source) 10 is collimated by a collimating lens 11 transmitted through a slit 21 of a diaphragm plate 20 and made incident upon a polygonal mirror 14 through a cylindrical lens 12 (having a power only in the sub-scanning direction) and a plane mirror 13.

The plane mirror 13 reflects the laser beam emitted from the cylindrical lens 12 at approximately a right angle. The plane mirror 13 is disposed so that the light incident upon the polygonal mirror 14 and the light reflected by the polygonal mirror 14 are separated in the sub-scanning direction. The separation angle of light by the polygonal mirror 14 is defined by a first separation angle $\theta 1$ on the reference optical axis.

The polygonal mirror 14 has six reflection surfaces 14a and is rotated about a center axis (shaft) 14b to reflect or deflect the light incident thereupon. The laser beam reflected or deflected by the polygonal mirror 14 is reflected toward the polygonal mirror 14 by a curved mirror 15 having positive power, and transmitted through an anamorphic lens 16 having power mainly in the sub-scanning direction. The laser beam transmitted through the anamorphic lens 16 is reflected by a light path refraction mirror 17 to form a beam spot on the photosensitive drum 18, so that the latter is scanned by the beam spot along a scanning line SL extending in the main scanning direction. The curved mirror 15 separates the incident light and the reflected light in the sub-scanning direction. The separation angle is defined by an angle $\theta 2$ on the reference optical axis.

In the main scanning direction, the laser beam is converged onto the photosensitive drum 18 by the curved mirror 15 and the anamorphic lens 16, and chiefly by the positive power of the curved mirror 15. In the sub-scanning direction, the laser beam is converged in the vicinity of the reflection surface 14a of the polygonal mirror 14 by the cylindrical lens 12, and thereafter converged again onto the photosensitive drum 18 chiefly by the power of the anamorphic lens 16. With this arrangement, deviation of the scanning line on the photosensitive drum 18 due to an error (inclination) of the reflection surface 14a does not take place.

When the laser beam reflected by the curved mirror 15 reaches a predetermined position out of the scanning area, the laser beam is reflected by a plane mirror 40 (which; and is opposed to the curved mirror 15 in front of the anamorphic lens 16) and made incident upon a light receiving element 42 which is adapted to detect a synchronization signal through a cylindrical lens 41 having positive power only in the sub-scanning direction.

The laser beam reflected by the curved mirror 15 is converged in the main scanning direction but is diverged in the sub-scanning direction. Therefore, the laser beam is converged in the sub-scanning direction by the cylindrical lens 41 having power only in the sub-scanning direction to form a spot on the light receiving element 42. Note that if the laser beam is deviated in the sub-scanning direction, the laser beam can be made incident upon the light receiving element 42 due to the correction effect of the cylindrical lens 41. The output signal of the light receiving element 42 is used to determine the time at which the writing operation for each scanning line begins.

The optical elements between the semiconductor laser 10 and the anamorphic lens 16 of an optical image forming system are housed in a casing 1 in the form of a box, as indicated by a two-dotted and dashed line in FIG. 1A. The polygonal mirror 14 is arranged so that the shaft 14b is perpendicular to the bottom surface 1a of the casing 1. The semiconductor laser 10, the collimating lens 11, the diaphragm plate 20 and the cylindrical lens 12 are arranged so that the laser beam emitted from the semiconductor laser 10 toward the plane mirror 13 is parallel with the bottom surface 1a of the casing 1. Namely, the principal ray of the laser beam is parallel with the bottom surface 1a of the casing 1 in the light path from the semiconductor laser 10 to the plane mirror 13.

The slit 21 formed in the diaphragm plate 20 is in the form of an elongated hole having different diameters in two orthogonal directions. In the illustrated embodiment, the slit 21 is made of a rectangular (see FIG. 1B); and whose major side and minor side substantially correspond to the main scanning direction and the sub-scanning direction, respectively. Since the beam diameter in the main scanning direction is larger than the beam diameter in the sub-scanning direction, as mentioned above, the f-number of the optical image forming system in the main scanning direction is substantially smaller than the f-number in the sub-scanning direction. The beam spot thus formed on the photosensitive drum 18 has an elliptical shape whose major and minor axes extend in the sub-scanning direction and main scanning direction, respectively.

In the case that light is made incident upon the polygonal mirror 14 at an angle in the sub-scanning direction, using the plane mirror 13 as in the illustrated embodiment, the direction of the section of the light bundle is distorted upon reflection by the plane mirror 13, as mentioned before. If the major side of the rectangular slit 21 is parallel with the bottom surface 1a of the casing 1, the direction of the beam section corresponding to the longitudinal direction of the slit 21 on the reflection surface 14a of the polygonal mirror 14 does not coincide with the main scanning direction due to the distortion. Consequently, the direction in which the f-number is substantially decreased does not coincide with the main scanning direction. Hence the direction of the beam spot formed on the photosensitive drum 18 is rotated away from an ideal direction. If a spot having an ideal directional property in which the minor axis extends in the main scanning direction is rotated, the spot diameter in the main scanning direction, i.e., the size of the spot projected on the straight line in the main scanning direction is increased. Consequently, the resolution of the image is reduced, and the required efficiency of the beam scanner cannot be obtained.

The diameter of the beam transmitted through the slit 21 in the sub-scanning direction is larger than that when there is no distortion, in the portion of the light path located closer to the photosensitive drum 18 than the polygonal mirror 14. In general, an optical element such as a lens or mirror, etc., used in an optical beam scanner is designed such that only the portion thereof through which the light passes exhibits an appropriate optical performance to curtail the manufacturing cost thereof. In an optical system in which such an optical element is employed, if the diameter of the light bundle in the sub-scanning direction is increased due to the optical distortion of the slit, the light actually reaches an area through which no light would pass by design, so that the refraction distribution is asymmetrical in the upper and lower portions of the light bundle in the sub-scanning direction, thus resulting in an occurrence of comatic aberration. To restrict the comatic aberration, it is necessary to produce an optical element which exhibits an appropriate optical property even on the peripheral portions of the area through which the light passes by design. However, this can cause an increase in the manufacturing cost.

Under these circumstances, in the present invention, the direction of the slit 21 of the diaphragm plate 20 is determined so that the longitudinal direction of an image of the slit 21 projected on the reflection surface 14a of the polygonal mirror 14 through the plane mirror 13 is substantially parallel with the bottom surface 14a of the casing 1. In order to achieve this, the slit 21 is inclined with respect to the bottom surface 1a of the casing 1 so that the longitudinal direction thereof defines a predetermined inclination angle φ with respect to the bottom surface 1a. This can be seen in FIG. 1B,", and which shows the diaphragm plate 20 viewed from the cylindrical lens side. The angle φ is, for example, 4°. The cylindrical lens 12 is disposed such that the generatrix thereof extends in the same direction as the longitudinal direction of the slit 21, i.e., the generatrix is inclined at 4° with respect to the bottom surface 1a.

Owing to the inclination of the slit 21 with respect to the cylindrical lens 12, the distortion caused by the plane mirror 13 is canceled or eliminated, so that the direction corresponding to the longitudinal direction of the image of the slit 21 projected on the polygonal mirror can be made coincident with the main scanning direction. Consequently, the beam spot on the photosensitive drum has an elliptical shape whose minor axis extends in the main scanning direction, and the area of each optical element upon which the light bundle is made incident is identical to the corresponding area by design. Thus, the comatic aberration can be corrected without increasing the manufacturing cost.

Figure 2:
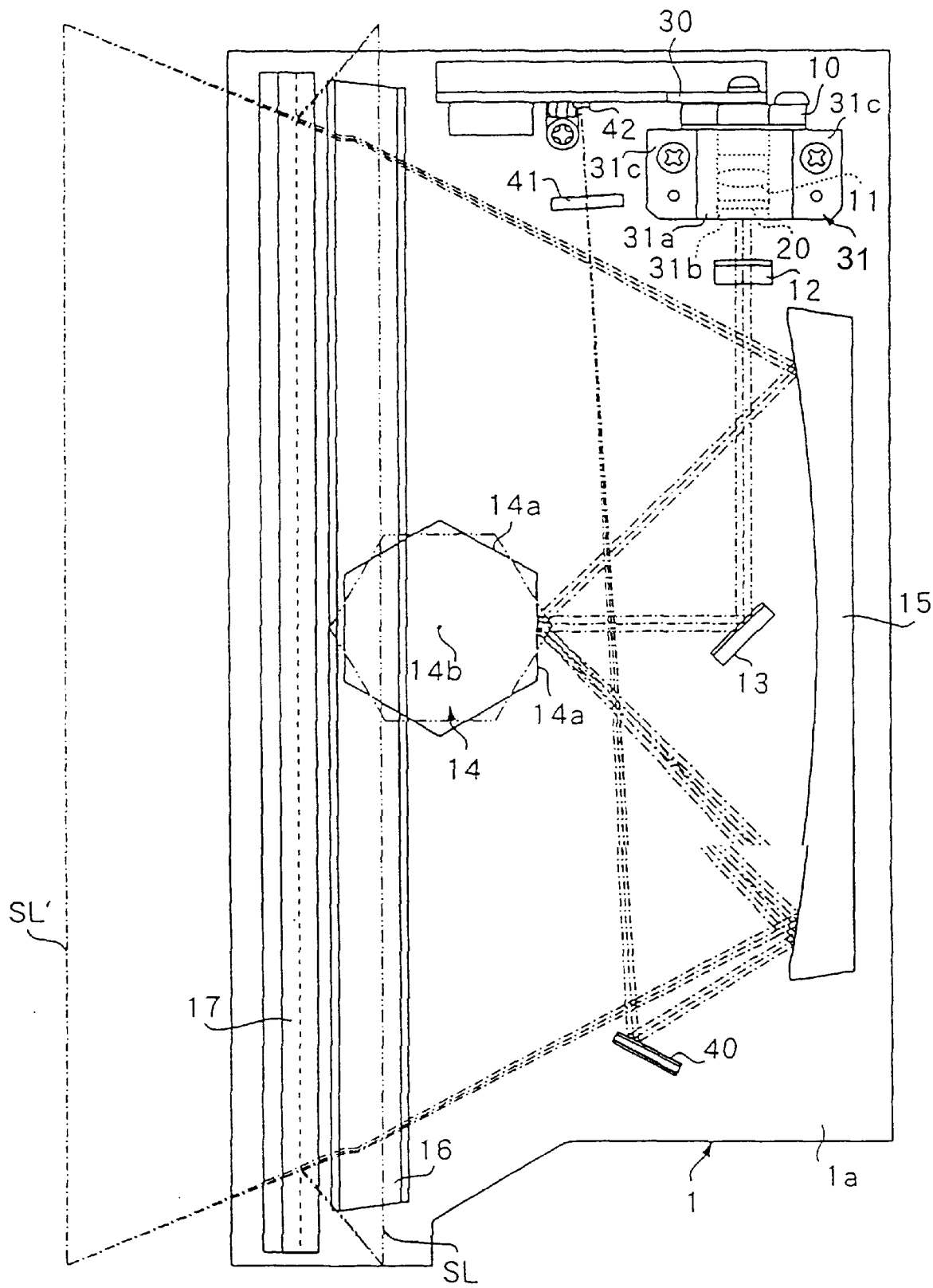
FIG. 2 is a plan view of the optical system assembly shown in FIG. 1A.
Figure 3:
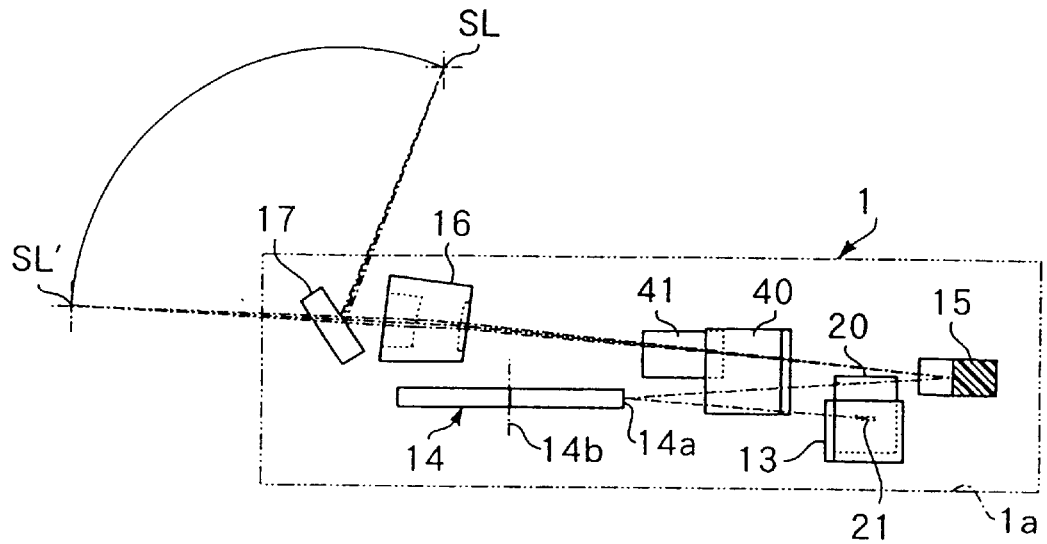
FIG. 3 is a partially broken side elevational view of FIG. 2.
Figure 4:
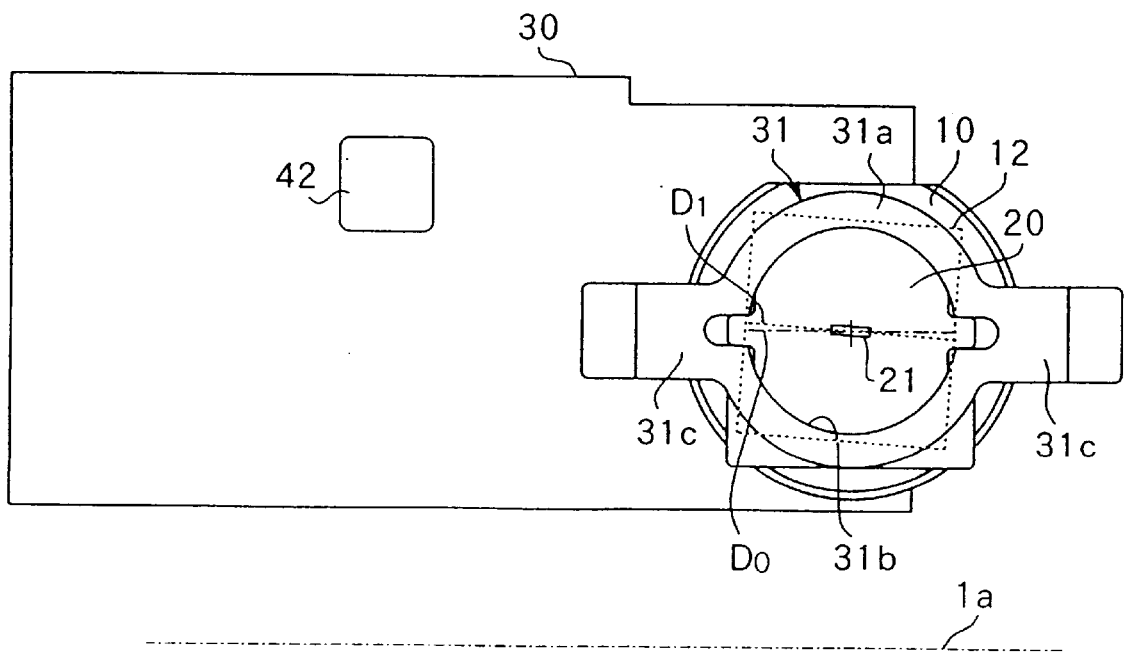
FIG. 4 is a plan view of the diaphragm plate shown in FIG. 2 viewed from the plane mirror side.

FIGS. 2 and 3 show a plan view and a side view, of the optical system shown in FIG. 1A, respectively. FIG. 4 is a plan view of a printed circuit board 30 and a holder 31 shown in FIG. 2, viewed from the plane mirror side. In FIGS. 2 and 3, "SL" and "SL'" represent the scanning line on the photosensitive drum 18 and the imaginary scanning line which is optically equivalent to the scanning line SL when the light path with the removed light path refraction mirror 17 is developed, respectively.

As shown in FIG. 2, the semiconductor laser 10 is secured to the generally rectangular printed circuit board 30 which is mounted to the casing 1, so that the major side of the rectangle is parallel with the bottom surface 1a of the casing 1. The collimating lens 11 and the diaphragm plate 20 are disposed in a receptacle hole 31b which is formed in a cylindrical barrel 31a of the holder 31 and which extends in the direction of the travel of the laser beam. The front end of the semiconductor laser 10 is inserted in the receptacle hole 31b of the holder 31. The cylindrical barrel 31a of the holder 31 is provided on opposite sides thereof with mounting portions 31c through which the holder 31 is connected to the casing 1. The longitudinal direction of the printed circuit board 30 is parallel with the bottom surface 1a of the casing 1, as can be seen in FIG. 4. The longitudinal direction D1 of the slit 21 is inclined with respect to the direction D0 parallel with the bottom surface 1a at an inclination angle of a few degrees.

The relationship among the inclination angle of the slit 21 and the cylindrical lens 12, the direction of the pn junction of the semiconductor laser, and the direction of the printed circuit board 30 will be discussed below.

Figure 5:
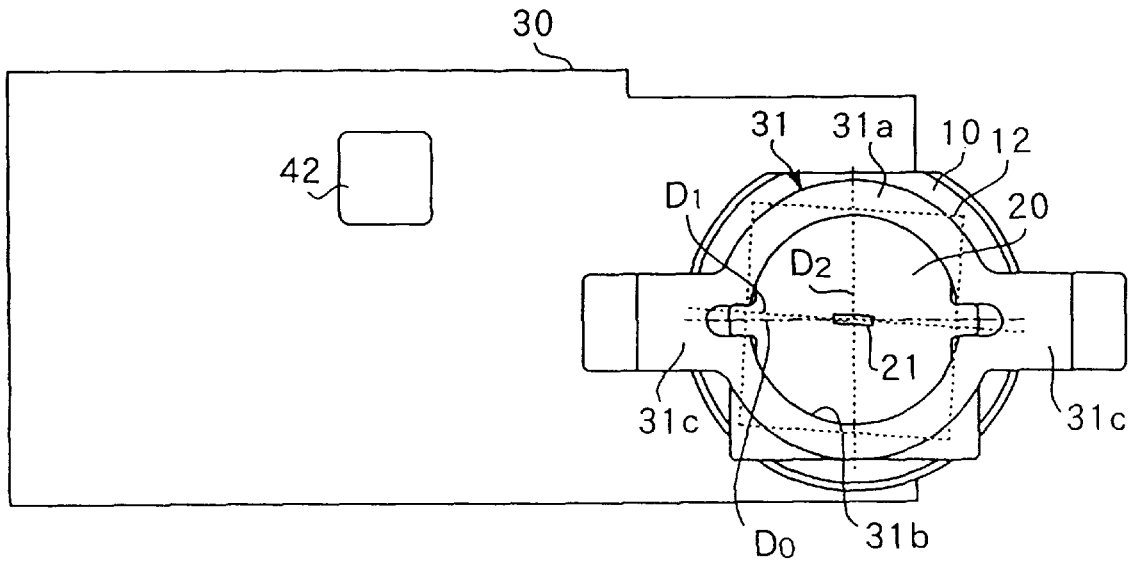
FIG. 5 is a plan view of a diaphragm plate showing a relationship between the direction of a pn junction of a semiconductor laser and the direction of a slit, by way of example; and, FIG. 6 is a plan view of a diaphragm plate showing another example of a relationship between the direction of a pn junction of a semiconductor laser and the direction of a slit.

FIG. 5 shows a plan view of the diaphragm plate 20, the cylindrical lens 12, and the printed circuit board 30, showing the relationship of the longitudinal direction D1 of the slit 21, the direction D2 of the pn junction of the semiconductor laser 10, and the direction D0 parallel with the bottom surface 1a, by way of example. In this example, the direction D2 of the pn junction is perpendicular to the direction D0 parallel with the bottom surface 1a, and the longitudinal direction D1 of the slit 21 (i.e., the direction of the generatrix of the cylindrical lens 12) is inclined with respect to the direction D0 parallel with the bottom surface 1a. In the arrangement shown in FIG. 5, the portion of the printed circuit board 30 other than the diaphragm plate 20 can be applied to an optical beam scanner in which the light path is not separated in the sub-scanning direction, i.e., the principal ray of the light bundle emitted from the light source and transmitted through the image forming system is in the same plane.

The light emitted from the semiconductor laser is divergent light whose divergence angle is smaller in the direction parallel with the pn junction than in the direction perpendicular thereto, as viewed in the direction of a reflection surface of a resonator. Consequently, the sectional shape of the laser beam which has been collimated by the collimating lens is elliptical in which the major axis extends in the direction perpendicular to the pn junction. To effectively utilize the amount of light, it is preferable that the longitudinal direction of the slit be substantially identical to the direction of the major axis of the elliptical laser beam. The printed circuit board to which the semiconductor laser is secured is generally rectangular and hence is designed so that the longitudinal direction of the printed circuit board is parallel with the bottom surface 1a of the casing 1 to facilitate the positioning thereof upon assembly or to minimize the mounting space thereof.

In a beam scanner in which no light path is separated in the sub-scanning direction, distortion of the light bundle may occur. Therefore, the direction of the slit is set to be parallel with the main scanning direction, i.e., the longitudinal direction of the printed circuit board and the direction of the pn junction of the semiconductor laser is set to be perpendicular to the longitudinal direction of the printed circuit board. Namely, if a printed circuit board to which the semiconductor laser is secured such that the direction of the pn junction is perpendicular to the longitudinal direction of the printed circuit board can be applied to a beam scanner in which the light path is separated in the sub-scanning direction as in the illustrated embodiment, these optical elements can be commonly used. In the embodiment illustrated in FIG. 5, the printed circuit board which is applied to the type of a beam scanner in which the light path is separated in the sub-scanning direction can be applied to the beam scanner as disclosed in the illustrated embodiment by varying the direction of the slit 21.

Figure 6:
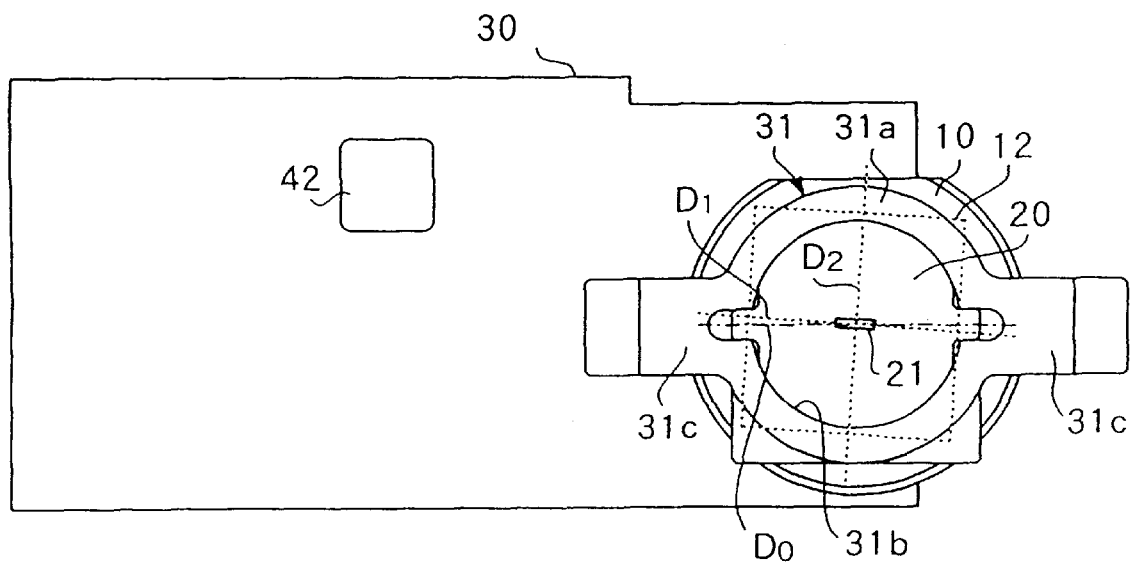

FIG. 6 shows a plan view of the diaphragm plate 20, the cylindrical lens 12, and the printed circuit board 30, showing the relationship of the longitudinal direction D1 of the slit 21, the direction D2 of the pn junction of the semiconductor laser 10, and the direction D0 parallel with the bottom surface 1a, according to another example of the invention. In this example, the relationship between the slit 21 and the printed circuit board 30 is the same as that shown in FIG. 5. The direction D2 of the pn junction is perpendicular to the longitudinal direction D1 of the slit 21. In the arrangement shown in FIG. 5, the printed circuit board 30 can be commonly used as mentioned above, but the amount of light is not utilized in the most effective way. To utilize the amount of light most effectively, it is preferable that the direction D2 of the pn junction be perpendicular to the longitudinal direction D1 of the slit.

As may be understood from the above discussion, according to the present invention, the space for the optical system in the direction of the travel of the light incident upon the polygonal mirror can be reduced by reflecting the light bundle incident upon the polygonal mirror by the plane mirror to bend the light path thereof. Moreover, the axis of rotation of the polygonal mirror can be made perpendicular to the bottom surface of lo the casing by making the light path of the light incident upon the plane mirror parallel with the bottom surface of the casing and inclining the normal line to the plane mirror with respect to the bottom surface of the casing, so that the polygonal mirror can be easily mounted to the casing. Furthermore, according to the present invention, influence by the distortion of the light bundle caused when the light is reflected by the plane mirror can be canceled or eliminated by inclining the direction of the slit of the diaphragm plate and the direction of the generatrix of the cylindrical lens with respect to the bottom surface of the casing. Thus, the directional property of the shape of the beam spot can be appropriately controlled so that the direction of the beam spot is identical to a real direction.

What is claimed is:

1. An optical beam scanner comprising:

a light source;

a slit formed in a diaphragm plate through which light emitted from said light source is transmitted;

a deflector which deflects and scans light transmitted through said slit in a main scanning direction;

an optical image forming system which converges light deflected by said deflector onto a surface to be scanned; and a plane mirror provided in a light path defined between said diaphragm plate and said deflector to reflect said light emitted from said light source toward said deflector;

wherein said plane mirror is disposed so that the light incident upon said deflector and the light reflected by said deflector are separated in a sub-scanning direction, wherein said slit has different diameters in two orthogonal directions, and a longitudinal direction of said slit is inclined, so that the longitudinal direction of an image of the slit projected on a reflection surface of said deflector through said plane mirror is substantially parallel with the main scanning direction.

2. An optical beam scanner according to claim 1, further comprising a cylindrical lens which is provided in the light path defined between said diaphragm plate and said deflector, having positive power in the sub-scanning direction.

3. An optical beam scanner according to claim 2, further comprising optical elements provided between said light source and said optical image forming system which are housed in a box-like casing provided with a bottom surface perpendicular to an axis of rotation of said deflector.

4. An optical beam scanner according to claim 3, wherein said deflector further comprises a polygonal mirror.

5. An optical beam scanner according to claim 3, wherein said light source is disposed so that a light emitted from said light source toward said plane mirror is parallel with said bottom surface of said casing.

6. An optical beam scanner according to claim 3, wherein said longitudinal direction of said slit is inclined with respect to said bottom surface at an inclination angle.

7. An optical beam scanner according to claim 3, wherein said cylindrical lens is disposed so that the direction of the generatrix is inclined with respect to said bottom surface in the same direction as said longitudinal direction of said slit at an inclination angle.

8. An optical beam scanner according to claim 3, wherein said light source is a semiconductor laser secured to a generally rectangular substrate, said substrate being mounted to said casing so that said longitudinal direction thereof is parallel with said bottom surface of said casing.

9. An optical beam scanner according to claim 4, wherein said optical image forming system comprises a curved mirror adapted to separate and reflect the light reflected by said polygonal mirror in the sub-scanning direction toward said polygonal mirror.

10. An optical beam scanner according to claim 8, wherein said semiconductor laser is secured to the substrate so that the direction of the pn junction thereof is perpendicular to said bottom surface of said casing.

11. An optical beam scanner according to claim 8, wherein said semiconductor laser is secured to the substrate so that the direction of the pn junction thereof is substantially identical to the longitudinal direction of said slit.

12. An optical beam scanner in which light emitted from a light source and transmitted through a slit formed in a diaphragm plate is made incident upon a polygonal mirror through a cylindrical lens having positive power in a sub-scanning direction, so that light reflected by the polygonal mirror is converged onto an object surface to be scanned through an optical image forming system, comprising;

a plane mirror provided in a light path defined between the diaphragm plate and the polygonal mirror to reflect the light emitted from the light source toward the polygonal mirror;

optical elements provided between the light source and the optical image forming system housed in a box-like casing provided with a bottom surface perpendicular to the axis of rotation of the polygonal mirror, wherein said light source is disposed so that light emitted from said light source toward said plane mirror is parallel with said bottom surface of said casing, wherein said plane mirror is disposed so that the light incident upon said polygonal mirror and the light reflected by said polygonal mirror are separated in the sub-scanning direction, wherein said slit has different diameters in two orthogonal directions, wherein a longitudinal direction of said slit is inclined with respect to said bottom surface at an inclination angle so that the longitudinal direction of an image of said slit projected on a reflection surface of said polygonal mirror through said plane mirror is substantially parallel with said bottom surface, wherein said cylindrical lens is disposed so that the direction of the generatrix is inclined with respect to said bottom surface in the same direction as the longitudinal direction of said slit at an inclination angle.

* * * * *